United States Patent [19]  
Goodrich

[11] 4,425,454  
[45] Jan. 10, 1984

[54] ASPHALT/ETHYLENE-VINYL ACETATE COPOLYMER COMPOSITION FOR AIR-BLOWING

[75] Inventor: Judson E. Goodrich, San Rafael, Calif.

[73] Assignee: Chevron Research Company, San Francisco, Calif.

[21] Appl. No.: 454,795

[22] Filed: Dec. 30, 1982

[51] Int. Cl.³ .............................................. C08L 31/00
[52] U.S. Cl. .................................. 524/69; 527/500
[58] Field of Search .......................... 524/69; 527/500

[56] References Cited

U.S. PATENT DOCUMENTS 2,450,756 10/1948 Hoiberg ................................. 208/4
2,762,755 9/1956 Kinnaird, Jr. ........................ 208/22
3,126,329 3/1964 Fort ....................................... 208/4

FOREIGN PATENT DOCUMENTS 703594 2/1965 Canada .................................. 524/69

*Primary Examiner*—Melvyn I. Marquis
*Attorney, Agent, or Firm*—D. A. Newell; J. M. Whitney; O. T. Dickinson

[57] ABSTRACT

An asphalt composition for air-blowing is disclosed comprising asphalt flux, ethylene/vinyl-acetate copolymer, and an air-blowing catalyst. The EVA copolymer is present in a weight percent of from 1 weight percent to 10 weight percent and is comprised of from 35 to 45 vinyl acetate.

5 Claims, No Drawings

ASPHALT/ETHYLENE-VINYL ACETATE COPOLYMER COMPOSITION FOR AIR-BLOWING

BACKGROUND OF THE INVENTION

In many asphaltic compositions it is particularly desirable to have a high degree of flexibility combined with toughness and durability. High ductility is especially desirable for meeting the specifications demanded in industrial asphalts used in materials such as roofing shingles, built-up roofs, canal linings, pipe coatings, etc. Additionally, because of the temperature stress to which these asphalts may be subjected, it is desirable to have an asphalt which can withstand low temperatures over time without developing significant brittleness and not flow at high temperatures. The parameters of these conditions may also be expressed as the well known physical properties of asphalt: viscosity, penetration and softening point.

The Penetration Index (PI), an expression of the relationship between penetration and softening point, is one preferred measure of the properties of industrial asphalts. Industrial asphalts usually have a PI greater than +2; as distinguished from paving asphalts, for example, having a PI of 0 or less. See "Properties of Asphaltic Bitumen", J. Ph. Pfeiffer, ed. (1950), page 166 et seq. Industrial asphalts also normally have softening points in the range of 220°–240° F. and penetration of 15–20 at 77° F., dmm.

One well known way to increase the Penetration Index is by modification of the asphalt by air-blowing. Air-blowing is a process by which a low softening point asphalt is converted to a more desirable asphalt by the forced introduction of air at temperatures ranging 400° to 500° F. The air-blowing process is also ordinarily facilitated by the addition of an asphalt catalyst which reduces the time required to bring asphalt to the desired specification and improves the softening point/penetration relationship of the asphalt product.

One way of increasing the toughness or flexibility of paving asphalts (versus industrial asphalts) is the addition of polymers or elastomers to the asphalt blend. One widely-known polymer, ethylene/vinyl-acetate copolymer (EVA), increases the ductility and toughness of paving asphalts, and therefore might have been thought to do likewise with industrial asphalts. However, it has been found that in the simple blending of EVA with already air-blown, high softening point industrial asphalt, the blend has proved incompatible. Specifically, softening points and viscosities were so greatly increased as to render the asphalt unsuitable for the desired purpose.

The present invention, however, has discovered a method for avoiding this incompatibility problem using a particular asphalt/EVA blend and air-blowing methods.

SUMMARY OF THE INVENTION

It has been discovered that in order to significantly increase the flexibility or ductility and toughness of an industrial asphalt, a polymer can be added to the asphalt prior to air-blowing. This combination of polymer addition and air-blowing not only produces the desired asphalt product but avoids previously observed problems in polymer/asphalt blends: incompatibility resulting in significantly increased softening points and viscosities. Additionally, a catalyst is employed to facilitate the speed at which the air-blowing process proceeds to completion and the maintenance of the desired softening point/penetration relationship in the final product.

The asphalt air-blowing charge stock suitable for use can be of varied character. Any petroleum residua or flux remaining following the separation of vaporizable hydrocarbons through lubricating oil fractions or any relatively high molecular weight extract obtained from petroleum refining or virgin, naturally-occurring asphalt can be used. For example the residua from Alaskan North Slope/Waxy Light Heavy crude blend, Arabian Heavy crude, Arabian Light crude, and the like can be employed. Of course, the difference in the asphalt change stock will result in somewhat different properties in the finished air-blown asphalt.

The polymers finding particular use in this application are ethylene/vinyl-acetate (EVA) copolymers. The preferred EVA copolymer is trade named ELVAX® 40P and manufactured by the E. I. DuPont de Nemours Corporation. EVA describes a family of thermoplastic polymers ordinarily ranging from 5 to 50 percent by weight percent of vinyl acetate incorporated into an ethylene chain. The preferred EVA, ELVAX® 40P grade contains approximately 39-42 weight percent of vinyl acetate and has a melt index of 48–66 g/10 minutes (ASTM D1238). It is a medium low viscosity resin showing excellent solubility in many organic solvents and is ordinarily used to improve flexibility and adhesion of lacquers and inks and in pressure-sensitive hot melt or solvent-applied adhesives. Like most EVA's, ELVAX®, tends to have physical characteristics approaching those of elastomers and is characterized by the formula:

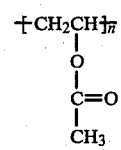

The preferred amount of EVA introduced into the asphalt flux ranges from about 1 weight percent to about 10 weight percent. The more preferred amount of EVA is 5% by weight EVA to 95% by weight asphalt flux.

The EVA is added to the asphalt prior to air-blowing and results in shorter air-blowing times, higher penetrations at a given softening point, greater ductility, and better flexibility (Reeve-Yeager) at 32° F. Additionally, it increases the flux viscosity and decreases the temperature susceptibility of viscosity.

A catalyst is also added to the EVA/asphalt blend prior to air-blowing to increase the penetration at a given softening point and cause the air-blowing reaction to proceed at a faster rate. Many air-blowing asphalt catalysts are well known in the art and include ferric chloride, $FeCl_3$, phosphorus pentoxide, $P_2O_5$, aluminum chloride, $AlCl_3$, boric acid, copper sulfate, $CuSO_4$, zinc chloride, $ZnCl_2$, phosphorus sesquisulfide, $P_4S_3$, phosphorus pentasulfide, $P_2S_5$, and phosphoric acid, $H_3PO_4$. By far the most useful and commonly used of these catalysts are ferric chloride, phosphorus pentoxide, and phosphoric acid. The catalyst is normally added to the blend in a weight percent ranging from about 0.1% by weight to about 5% by weight with our preferred amount being about 0.35% by weight and our preferred catalyst being ferric chloride, FeCl$_3$. The catalyst is added to the EVA/asphalt blend prior to air-blowing.

The composition is blended by pre-heating the asphalt to a temperature about 200° to 350° F., adding the EVA copolymer and the catalyst into the asphalt, and thoroughly mixing the asphalt flux. Thereafter the asphalt/EVA/catalyst blend is air-blown in accordance with procedures known in the art similar to those taught in U.S. Pat. Nos. 2,450,756, 2,762,755, and 3,126,329, said patents incorporated herein by reference.

More specifically the asphalt is air-blown at a temperature of from about 400° F. to 550° F. and air, oxygen or an oxygen-inert gas mixture is bubbled or blown through the composition for sufficient time to achieve the desired softening point. Generally, the air-blowing operation is carried out for a period from about 0.5 hours to about 12 hours.

EXAMPLE I 2850 g of low softening point, 80/20 Alaskan North slope/Waxy Light Heavy, distillation-residua asphalt was preheated to 325° F. 150 g of ELVAX ® 40P grade ethylene/vinyl-acetate copolymer in pellet form and 16.6 g of FeCl$_3$.6H$_2$O catalyst (equivalent to 10.0 g anhydrous FeCl$_3$) were added with stirring. The blend was stirred for 30 to 45 minutes at 325° F. 3000 g of the above flux blend was charged to an air-blowing still. The asphalt/EVA/catalyst blend was heated to 500° F. with stirring, and a volume of air corresponding to about 0.1 standard cubic foot per minute was blown through the asphalt for about 93 minutes to achieve a softening point of approximately 220° F.

EXAMPLE II

Air-blown products were produced in accordance with Example I, with the exception that the FeCl$_3$.6H$_2$O was omitted. The air-blowing time was increased to approximately 180 minutes and the softening point to about 227° F.

COMPARATIVE EXAMPLES

Examples were prepared according to Examples I and II with the exception that the ethylene/vinyl-acetate copolymer was omitted.

The results of Examples I, II and the Comparative Examples are tabulated in Table I demonstrating the increased penetration, ductility and flexibility obtained using the asphalt blend and method of the present invention. The softening points were measured according to the ring and ball test, ASTM D-2398-76; and the penetration by ASTM D5-73. The ductility ws measured according to ASTM D113-79. The flexibility is measured by the Reeve-Yeager method as detailed in *Asphalts and Allied Substances,* Vol. V, Abraham, Van Nostrand, (1963), pp. 120-122.

TABLE I

| Example | 1 | 2 | 3 | 4 |
|---|---|---|---|---|
| Composition (wt. %) | | | | |
| Asphalt | ~100 | ~100 | ~95 | ~95 |
| ELVAX ® 40P[1] EVA copolymer | 0 | 0 | 5 | 5 |
| FeCl$_3$.6H$_2$O | 0.35 | 0 | 0.35 | 0 |
| Properties: | | | | |
| Softening Point °F. | 224 | 222 | 225 | 227 |
| Penetration 77° F., dmm | 18 | 12 | 30 | 15 |
| Ductility 77° F., cm | 3.2 | 1.2 | 12.0 | 5.5 |
| Flexibility 32° F., Deg (Reeve-Yeager) | 19; 24; 27 | 36; 28; 18 | 180+; 180+; 180+ | 76; 24; 40 |

[1] 39–42% vinyl acetate

What is claimed is:

1. An asphalt composition for air-blowing and producing an industrial grade asphalt, comprising asphalt; from about 1 weight percent to about 10 weight percent ethylene/vinyl-acetate copolymer; and from about 0.1 weight percent to about 5 weight percent of an air-blowing asphalt catalyst.

2. The composition according to claim 1 wherein the ethylene/vinyl-acetate copolymer is comprised of from about 35.0 to about 45.0 weight percent vinyl acetate and has a melt index of about 45 to about 70.

3. The composition according to claim 2 wherein the catalyst is selected from the group consisting of ferric chloride, phosphorus pentoxide, and phosphoric acid.

4. The composition according to claim 3 wherein the weight percent of ethylene/vinyl-acetate copolymer is from about 4 weight percent to about 6 weight percent.

5. The composition according to claim 4 wherein the weight percent of ethylene/vinyl-acetate copolymer is about 5 weight percent.

* * * * *